United States Patent [19]
Tabe

[11] Patent Number: 5,642,796
[45] Date of Patent: Jul. 1, 1997

[54] BICYCLE HUB

[75] Inventor: Koshi Tabe, Sakai, Japan

[73] Assignee: Shimano, Inc., Osaka, Japan

[21] Appl. No.: 508,605

[22] Filed: Jul. 27, 1995

[30] Foreign Application Priority Data

Aug. 2, 1994 [JP] Japan .................................. 6-181043

[51] Int. Cl.⁶ ......................................................... F16D 41/28
[52] U.S. Cl. .......................... 192/64; 192/45; 192/48.92; 301/110.5
[58] Field of Search ........................... 192/64, 45, 48.92; 301/105.1, 110.5

[56] References Cited

U.S. PATENT DOCUMENTS

| | | | |
|---|---|---|---|
| 2,211,548 | 8/1940 | Schwinn | 192/64 |
| 3,053,361 | 9/1962 | Hause . | |
| 3,249,186 | 5/1966 | Kluwe | 192/45 |
| 4,580,670 | 4/1986 | Nagano | 192/64 |
| 5,129,711 | 7/1992 | Chen . | |

FOREIGN PATENT DOCUMENTS

WO93/06380  4/1993  WIPO .

*Primary Examiner*—Richard M. Lorence
*Attorney, Agent, or Firm*—James A. Deland

[57] ABSTRACT

A bicycle hub includes a hub body, an inner member coupled to the hub body for rotation therewith, and an outer member disposed about the inner member for rotation relative to the inner member. The outer member is adapted to be coupled to a chain gear for rotation therewith. A plurality of clutch rollers are disposed between an outer circumferential surface of the inner member and an inner circumferential surface of the outer member. The outer circumferential surface of the inner member and the inner circumferential surface of the outer member are shaped so that (i) when the plurality of clutch rollers are disposed in a first position the inner member and the outer member rotate together; and (ii) when the plurality of clutch rollers are disposed in a second position the inner member and the outer member can rotate relative to each other.

12 Claims, 5 Drawing Sheets

BICYCLE HUB

BACKGROUND OF THE INVENTION

The present invention is directed to bicycle hubs and, more particularly, to a bicycle hub which is equipped with [a] an inner member which is connected to one side of a bicycle hub body so that said inner is free to rotate as a unit with said hub body, [b] an outer member to which a chain gear is connected and which is supported by the inner member via supporting members so that said inner and outer members are free to rotate relative to each other, and [c] a hub shaft which supports the hub body and the inner member via balls and so that said hub body and inner member are free to rotate.

In bicycle hubs of the this type, a one-way rotational transmission mechanism has conventionally been constructed between the outer member and inner member by means of pawls which are attached to the inner member so that said pawls are free to pivot in a manner which allows said pawls to be extended or retracted, and sawtooth-form teeth formed on the outer member in such a manner that the aforementioned pawls can engage with and disengage from said teeth. Such a construction is shown, for example in Japanese Utility Model No. 1-13605. Specifically, such a mechanism makes it possible to transmit the rotational force generated when the outer member is driven by a chain gear to the hub body, and also makes it possible for the hub body to rotate freely in the direction of forward rotation with respect to the outer member.

Conventionally, it has been necessary to form pawl holding parts which attach the pawls to the inner member so that pawls can be extended or retracted, and to form sawtooth-form teeth on the outer member. This creates a complicated structure, and the resulting device is difficult to manufacture.

SUMMARY OF THE INVENTION

The present invention is directed to a bicycle hub which has superior transmission performance but which has a simpler structure than known hubs and can be manufactured more easily. In one embodiment of the present invention, a bicycle hub includes a hub body, an inner member coupled to the hub body for rotation therewith, and an outer member disposed about the inner member for rotation relative to the inner member. The outer member is adapted to be coupled to a chain gear for rotation therewith. A plurality of clutch rollers are disposed between an outer circumferential surface of the inner member and an inner circumferential surface of the outer member. The outer circumferential surface of the inner member and the inner circumferential surface of the outer member are shaped so that (i) when the plurality of clutch rollers are disposed in a first position the inner member and the outer member rotate together; and (ii) when the plurality of clutch rollers are disposed in a second position the inner member and the outer member can rotate relative to each other. More specifically, a distance between the outer circumferential surface of the inner member and the inner circumferential surface of the outer member decreases in a direction opposite a forward rotational direction of the outer member so that (i) when the plurality of clutch rollers are disposed in a narrow section, the inner member and the outer member rotate together; and (ii) when the plurality of clutch rollers are disposed in a wider section, the inner member and the outer member can rotate relative to each other.

In one embodiment of the present invention, the plurality of clutch rollers comprise a first plurality of clutch rollers and a second plurality of clutch rollers, wherein the first plurality of clutch rollers are disposed in series with the second plurality of clutch rollers in a direction of an axis of rotation of the hub body. Using a plurality of serially arranged rollers rather than a plurality of longer rollers improves transmission performance by avoiding slipping that occurs when longer rollers are used. Such slippage occurs when manufacturing errors cause the rollers to assume an inclined attitude in the clutch spaces with respect to the rotational axis of the hub. On the other hand, the total length of each set of serially disposed rollers is the same or nearly the same as the length of a single long roller, thus reducing the transmission load per unit length so that pressure scars are avoided even under heavy torque loads.

In a further embodiment, the hub body includes an insertion recess which opens toward one end of the hub body, wherein a bottom of the insertion recess is disposed axially inwardly of a hub rim. In this embodiment an end of the inner member, an end of the outer member, and an end of the first plurality of clutch rollers are disposed in the insertion recess. This construction allows the total length of the plurality of serially arranged clutch rollers to be increased while also widening the spacing of the hub rims and shortening the overall hub length to increase strength. If the outer member is supported on the inner member solely by the plurality of clutch rollers, then further space savings result from not having to provide additional space for separate support rollers.

In another embodiment of the present invention, the inner member includes a spline for engaging a spline on the hub body. A tubular screw is provided having a stopper on one end and a threaded portion on another end. The threaded portion of the tubular screw engages a threaded portion of the hub body, and the stopper engages a portion of the inner member for retaining the inner member to the hub body. This facilitates manufacture of the components. Alternatively, the inner member may include a threaded portion which engages a threaded portion of the hub body for connecting the inner member to the hub body. This construction also facilitates manufacture of the components.

DETAILED DESCRIPTION OF THE EMBODIMENTS

Figure 1:
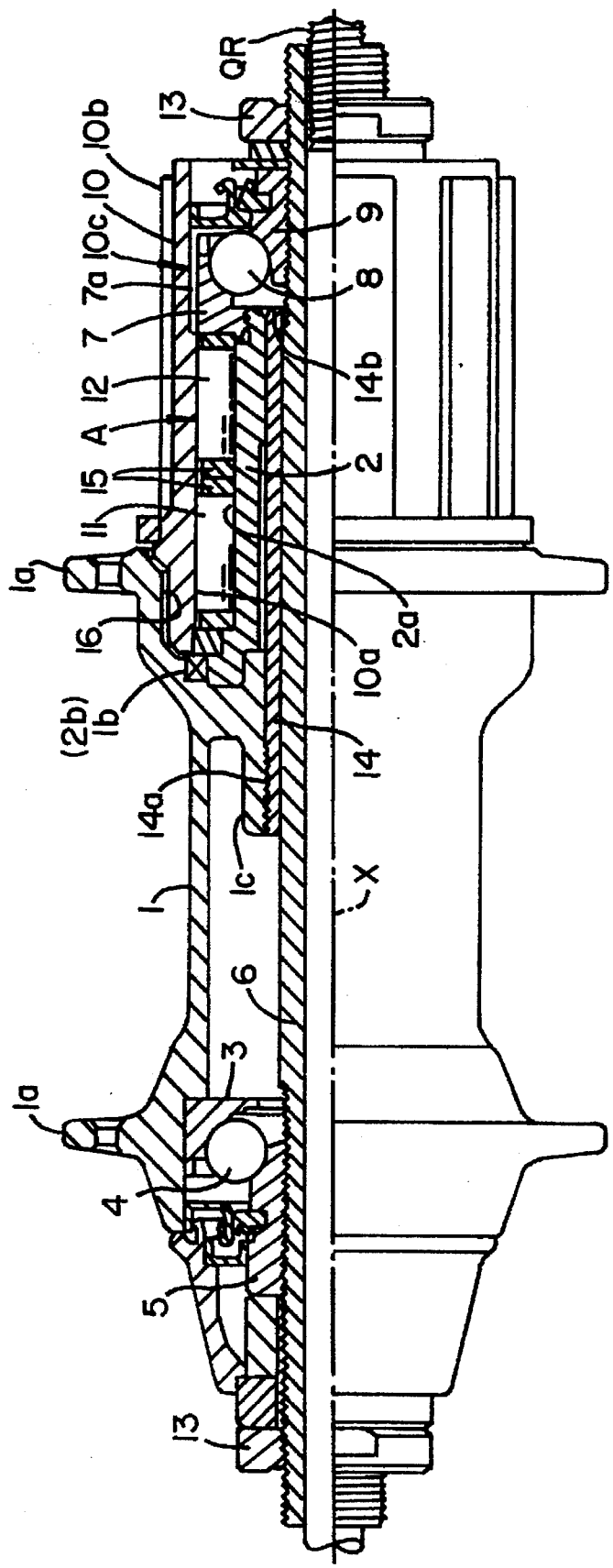
FIG. 1 is a cross-sectional view of a particular embodiment of a bicycle hub according to the present invention.

FIG. 1 is a cross-sectional view of a particular embodiment of a bicycle hub according to the present invention. As is shown in FIG. 1, a hub body 1 includes a pair of hub rims 1a, 1a and an inner member 2 which is concentrically connected to one end of the hub body 1 so that the inner member 2 can rotate as a unit with the hub body 1. The end portion of the hub body 1 located on the opposite end of the hub body 1 from the inner member 2 is rotatably supported by a tubular hub shaft 6 via a ball socket part 3, balls 4 and a ball retainer part 5. The end portion of the inner member 2 located on the opposite end of the inner member 2 from the hub body 1 is rotatably supported by the hub shaft 6 via a ball socket part 7 (which is screwed onto an attachment screw part 2e of the inner member 2 as is clearly shown in FIG. 3), balls 8 and a ball retainer part 9. An outer member 10 is concentrically installed on the outside of the inner member 2 so that both parts are free to rotate relative to each other. This outer member 10 and the inner member 2 are arranged so that the parts can be linked by a one-way rotational transmission mechanism A equipped with clutch rollers 11, 12 (etc.) which are positioned between the two parts.

Linking members 13 are attached to both ends of the hub shaft 6 so that the linking members 13 act as lock nuts for the ball retainer parts 5 and 9. The linking members 13 are fastened to the rear fork end of the bicycle body by the tightening force of a quick release device QR mounted on the hub shaft 6. As a result of this fastening to the rear fork end, the hub shaft 6 is connected to the bicycle body so that the hub shaft 6 cannot rotate. On the other hand, the hub body 1 and outer member 10 are attached to the bicycle body so that the parts are free to rotate.

A chain gear (not shown in the figures) is fit over a spline part 10b formed on the outer circumference of the outer member 10, thus linking the chain gear to the outer member 10 so that the chain gear and outer member rotate as a unit. When the chain gear linked to the outer member 10 is driven in the direction of rotation F shown in FIG. 2, the rotational force of the outer member 10, which rotates in the direction of rotation F together with the chain gear, is transmitted to the hub body 1 by the action of the one-way rotational transmission mechanism A. the hub body 1, in turn, drives a wheel (not shown in the figures), which is connected to the hub rims 1a via spokes (not shown in the figures), in the direction of forward rotation. In cases where the chain gear is stopped or caused to rotate in the opposite direction from the direction of rotation F during the operation of the bicycle, the outer member 10 either stops or rotates in the opposite direction together with the chain gear. However, the hub body 1 continues to rotate in the direction of rotation F relative to the outer member 10 as a result of the action of the one-way rotational transmission mechanism A and the rotational inertia of the wheel. In other words, the system is arranged so that the wheel is caused to rotate in the direction of forward rotation by inertia.

Figure 2:
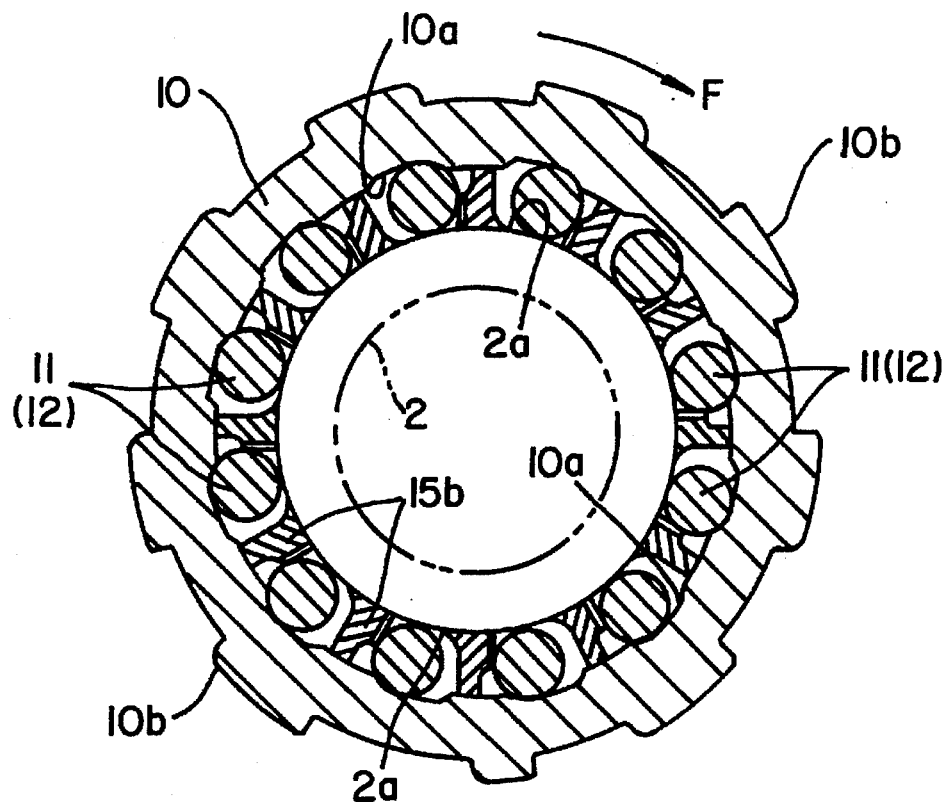
FIG. 2 is a cross-sectional view of the one-way rotational transmission shown in FIG. 1.

As shown in FIGS. 1 and 2, the one-way rotational transmission mechanism A is made up of the outer member 10, the inner member 2, a plurality of the clutch rollers 11 which are positioned side by side in the circumferential direction of the outer member 10 and inner member 2 in the hub-body-side portion of an annular space formed between the inner member 2 and outer member 10, and a plurality of the clutch rollers 12 which are positioned side by side in the circumferential direction of the outer member 2 and inner member 10 in the side of the annular space where the ball socket part 7 is positioned.

Figure 3:
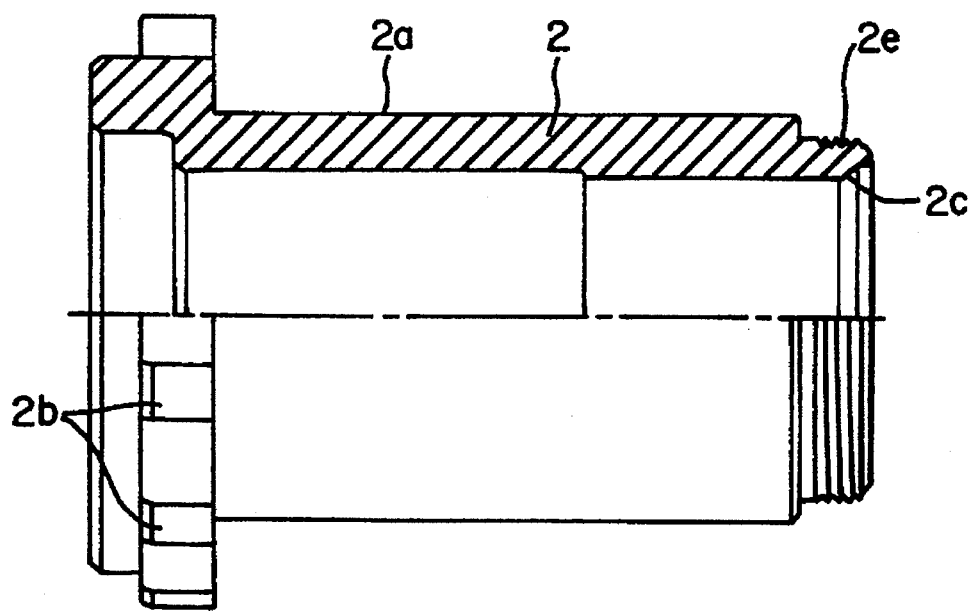
FIG. 3 is a cross-sectional view of a particular embodiment of an inner member according to the present invention.

In order to allow the inner member 2 to be manufactured separately from the hub body 1, the inner member 2 is formed by a separate tubular member as shown in FIG. 3. A spline part 2b which is provided on the outer member circumference of one end of the inner member 2 engages with the spline part 1b of the hub body 1, and a screw part 14a formed at one end of a tubular screw 14 which is fit over the hub shaft 6 and passed through the boss part 1c of the hub body 1 is screwed into the boss part 1c of the hub body 1. A head part 14b which is positioned at the opposite end of the tubular screw 14 from the screw part 14a contacts the inclined end surface 2c of the inner member 2, as shown in FIG. 2, and thus acts as a stopper. In this way, the tubular screw 14 prevents the inner member 2 from slipping out of the spline part of the hub body 1, and the inner member 2 rotates as a unit with the hub body 1.

As shown in FIG. 2, the plurality of clutch rollers 11 and 12 are inserted into an annular space between the outer member 10 and the inner member 2 together with a roller cage 15 (of the type shown in FIG. 5) in positions which are such that each of the clutch rollers 11 and 12 corresponds to one of a plurality of inner circumferential surface parts 10a that are positioned on the inner circumferential surface of the outer member 10 at equal intervals in the circumferential direction of the outer member 10. Each of the plurality of inner circumferential surfaces parts 10a of the outer member 10 has a long band-form shape which extends in the direction of the rotational axis X of the hub body 1. The clutch rollers 11 and 12 are interposed between the outer member 10 and the inner member 2 in roller pairs whose number is equal to the respective numbers of clutch rollers 11 and 12, with the clutch rollers 11 and 12 being lined up end to end in the direction of the rotational axis X of the hub body 1. The clutch rollers 11 and 12 in each roller pair act on the same inner circumferential surface part 10a by installing the clutch roller 11 of each roller pair in the portion of the corresponding band-form inner circumferential surface part 10a that is closer to the hub body 1, and installing the clutch roller 12 of each roller pair in the portion of the corresponding band-form inner circumferential surface part 10a that is further away from the hub body 1.

Each of the plurality of inner circumferential surface parts 10a is formed as a clutch cam surface which is such that the space between the cam surface and the cylindrical outer member circumferential surface 2a of the inner member 2 becomes smaller in the rearward direction with respect to the direction of driving rotation of the outer member 10. When the clutch rollers 11 and 12 move to the narrow ends of the spaces between the inner circumferential surface parts 10a and the outer circumferential surface 2a of inner member (2), the clutch rollers 11 and 12 are engaged between the inner circumferential surface parts 10a and outer circumferential surface 2a. As a result of the wedge action caused by the engagement, the outer member 10 and inner member 2 rotate as a unit. When the clutch rollers 11 and 12 move from this state to the wide ends of the spaces between the inner circumferential surface parts 10a and the outer circumferential surface 2a of inner member (2), the engagement of the clutch rollers between the inner circumferential surface parts 10a and the outer circumferential surface 2a is released, so that the outer member 10 and inner member 2 can rotate relative to each other.

In other words, when the chain gear is driven in the direction of rotation F, the outer member 10 rotates in the direction of rotation F together with the chain gear, and the rotational resistance arising from the ground contact of the wheel acts on the hub body 1. As a result, the outer member 10 rotates in the direction of rotation F with respect to the inner member 2. Because of this relative rotation between the outer member 10 and the inner member 2, the clutch rollers 11 and 12 move to the narrow ends of the spaces between the inner circumferential surface parts 10a of the outer member 10 and the outer circumferential surface 2a of the inner member 2, so that the engaged state is established. When the one-way rotational transmission mechanism A is placed in an engaged state, the rotational force of the outer member 10 in the direction of rotation F is transmitted to the hub body 1, thus making it possible to cause forward rotation of the wheel.

Since the clutch rollers 11 and 12 are separate rollers which are lined up end to end in the direction of the rotational axis X of the hub body 1 (while acting on the same inner circumferential surface parts 10a), faulty transmission tends not to occur. If the clutch rollers 11 and 12 were instead formed by single long clutch rollers, the ends of the clutch rollers may be shifted in the circumferential direction of the outer member 10 and inner member 2 as a result of manufacturing error in the inner circumferential surface parts 10a, etc., so that the clutch rollers assume an inclined attitude. This could cause transmission slipping. In the present invention, however, the clutch rollers 11 and 12 are separate, smaller parts. Thus, even in such cases of manufacturing error, there is merely a slight shift of the ends of the clutch rollers in the circumferential direction of the outer member 10 and inner member 2, and the clutch rollers do not assume an inclined attitude (or even if the clutch rollers do assume an inclined attitude, the inclination is not as great as in the case of single rollers, so that faulty transmission such as slipping, etc., tends not to occur).

When the chain gear is stopped or caused to rotate in the opposite direction from the direction of rotation F, the inner member 2 continues to rotate in the direction of rotation F with respect to the outer member 10 as a result of the inertial rotation of the wheel. In this case the clutch rollers 11 and 12 move to the wide ends of the spaces between the inner circumferential surface parts 10a of the outer member 10 and the outer circumferential surface 2a of the inner member 2, so that the disengaged state is established. As a result, the one-way rotational transmission mechanism A is disengaged, so that the inner member 2 can rotate in the direction of rotation F with respect to the outer member 10, thus allowing inertial rotation of the wheel.

The difference between the diameter of the outer circumferential surface portion 7a of the ball socket part 7 that faces the inner circumferential surface portion 10c of the outer member 10 and the diameter of the inner circumferential surface portion 10c of the outer member 10 is set so that the ball socket part 7 does not have a supporting effect on the outer member 10, and so that the inner member 2 supports the outer member 10 via the clutch rollers 11 and 12 regardless of whether the rotational transmission mechanism A is in an engaged state or disengaged state. In other words, the clutch rollers 11 and 12 also act as supporting members which are interposed between the outer member 10 and inner member 2, thus supporting the outer member 10 to the inner member 2 so that the outer member 10 is free to rotate. Accordingly, compared to cases where special supporting members are installed at both ends of the clutch rollers 11 and 12, the lengths of the clutch rollers 11 and 12 can be increased by an amount corresponding to the space required for the installation of such special supporting members.

As is shown in FIG. 1, an insertion recess 16 which opens toward one end of the hub body 1 is formed in the hub body 1 so that the bottom of the recess 16 is recessed further toward the inside of the hub body 1 than the hub rim 1a on the outer member side of the hub body 1. Furthermore, the inner member 2, outer member 10 and one end of each of the clutch rollers 11 (which are positioned closer to the hub body 1 than the clutch rollers 12) are inserted into the insertion recess 16. Compared to cases where the inner member 2, outer member 10 and clutch rollers 11 are positioned to the outside of the hub body 1 for their entire lengths, the overall length of the hub can be shortened and the spacing of the hub rims of the hub body 1 can be widened, while at the same time the total length of the clutch rollers 11 and 12 lined up end to end in the direction of the rotational axis X of the hub body can be increased.

Figure 4:
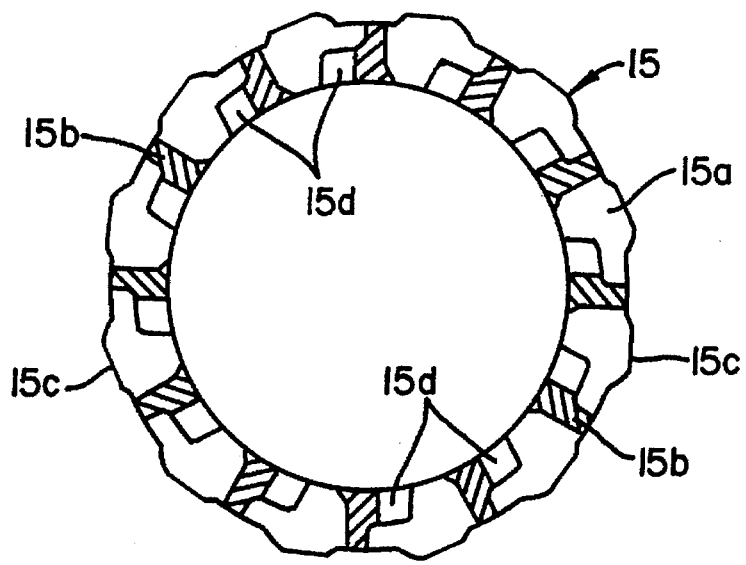
FIG. 4 is a cross-sectional view of a particular embodiment of a roller cage according to the present invention.
Figure 5:
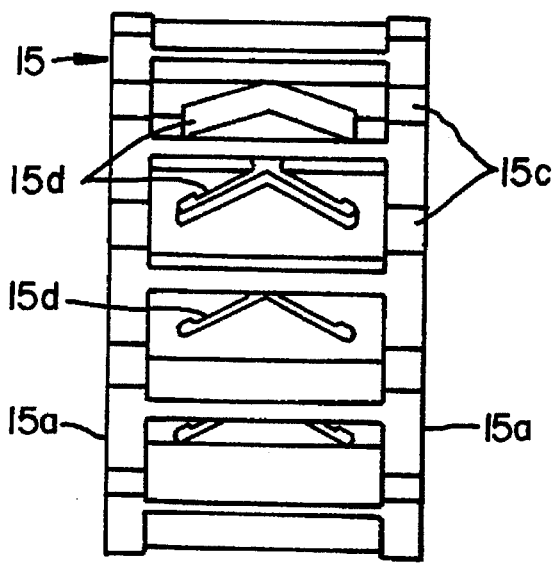
FIG. 5 is a side view of the roller cage shown in FIG. 4.
Figure 6:
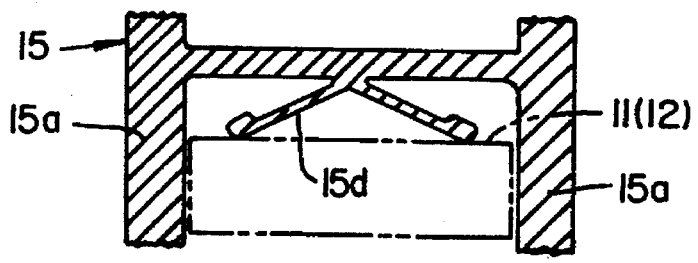
FIG. 6 is a more detailed view of the roller cage shown in FIG. 5 which more clearly shows a spring mechanism.

Both the cage 15 for the clutch rollers 11 and the cage 15 for the clutch rollers 12 are constructed as shown in FIGS. 4 and 5. Specifically, each of the cages 15 is formed from a pair of side wall parts 15a, 15a which are formed in an annular shape so as to include an annular space between the outer member 10 and inner member 2, and a plurality of partitioning wall parts 15b which connect one of the side wall parts 15a with the other side wall part 15a, and which are positioned so that the partitioning wall parts 15b partition the annular space between the outer member 10 and inner member 2 into a plurality of roller accommodating spaces in the circumferential direction of the outer member 10. Furthermore, when these cages 15 are mounted between the outer member 10 and the inner member 2, projecting parts 15c which are formed on the circumferences of the side wall parts 15a are inserted into the inner member circumferential surface parts 10a of the outer member 10. As a result, the side wall parts 15a are anchored so that they rotate as a unit with the outer member 10, thus causing the cages 15 to rotate as a unit with the outer member 10. The plurality of partitioning wall parts 15b are positioned so that one partitioning wall part 15b is located between each pair of adjacent inner member circumferential surface parts 10a. Furthermore, spring parts 15d (shown clearly in FIG. 6) which are connected to the partitioning wall parts 15b push the respective clutch rollers 11 or 12 toward the narrow ends of the spaces between the inner member circumferential surface parts 10a and the outer member circumferential surface 2a, thus making it possible to achieve quick engagement of the clutch rollers 11 or 12 between the outer member 10 and inner member 2.

Figure 7:
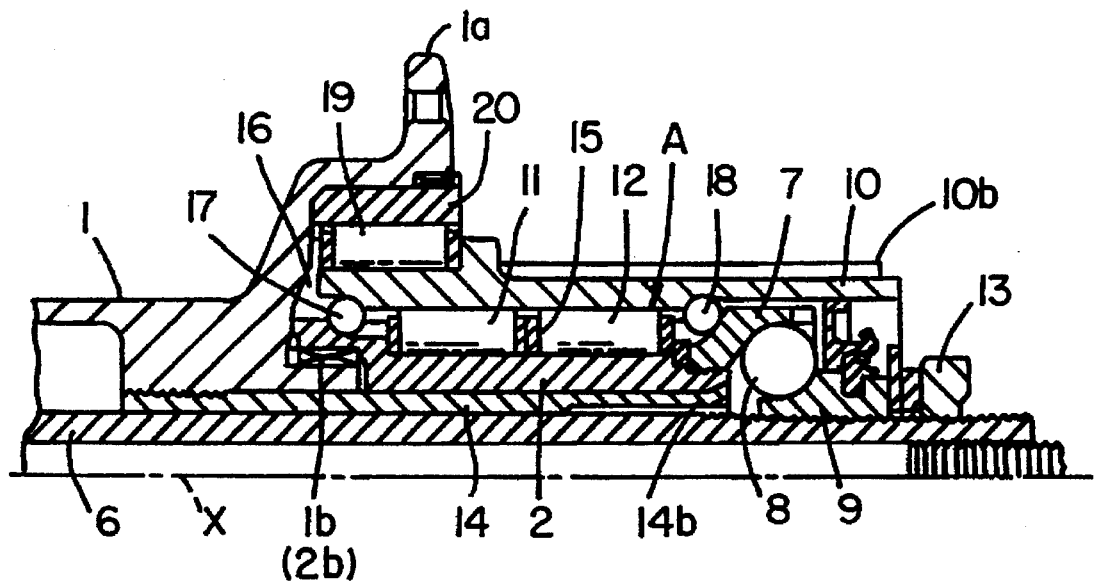
FIG. 7 is a cross-sectional view of an alternative embodiment of a bicycle hub according to the present invention.

FIG. 7 is a cross-sectional view of an alternative embodiment of a bicycle hub according to the present invention. As shown in FIG. 7, a spline part 2b is installed on the inner circumference of one end of the inner member 2, and this spline part 2b engages with a spline part 1b positioned inside the insertion recess 16 of the hub body 1, so that the inner member 2 and hub body 1 can rotate as a unit. Inner member 2 is rotatably supported via balls 17 which are positioned further toward the hub body than the clutch rollers 11, and balls 18 which are positioned between the clutch rollers 12 and the ball socket part 7. Moreover, in the insertion recess 16 of the hub body 1, support rollers 19 and a race member 20 are interposed between one end of the outer member 10 and the hub body 1, so that the hub body 1 supports the end of the outer member 10 via the race member 20 and support rollers 19.

Figure 8:
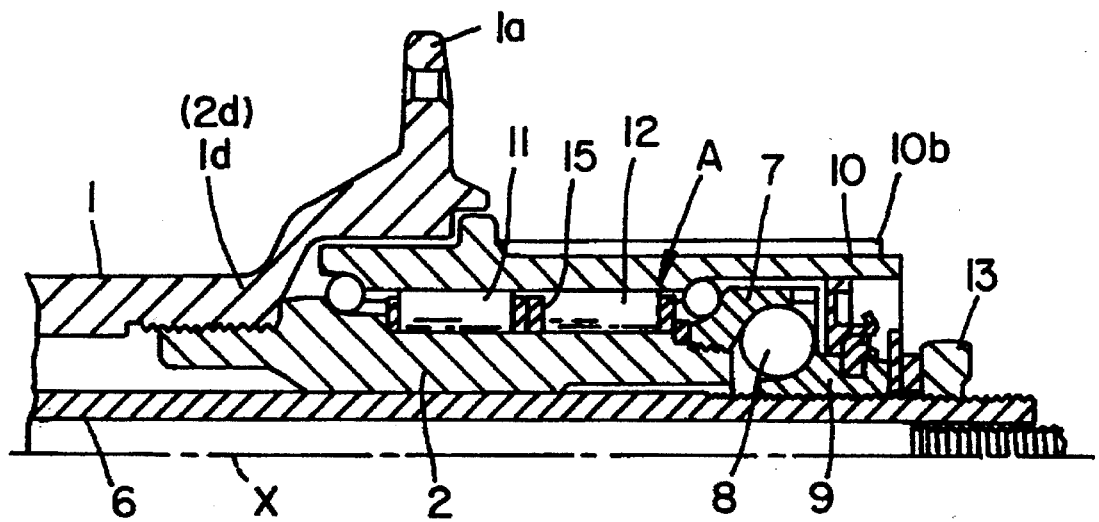
FIG. 8 is a cross-sectional view of another alternative embodiment of a bicycle hub according to the present invention.

FIG. 8 shows a portion of a bicycle hub equipped with an alternative embodiment of the structure that connects the inner member 2 to the hub body 1. In this embodiment, an attachment screw part 2d is formed on the outer circumference of one end of the inner member 2, and the inner member 2 is connected to the hub body 1 by screwing the inner member 2 into the attachment screw part 1d of the hub body 1 by means of the screw part 2d.

If the inner member 2 is connected to the hub body 1 by means of a tubular screw 14 or screw structure as in the respective embodiments described above, a manufacturing method can be used in which the hub body 1 and inner member 2 are assembled after the parts have been separately manufactured. Accordingly, such an arrangement is advantageous. However, it would also be possible to use a construction in which the inner member 2 is formed simultaneously with the hub body 1, so that the hub body 1 and inner member 2 are both formed as a single integral part.

Figure 9:
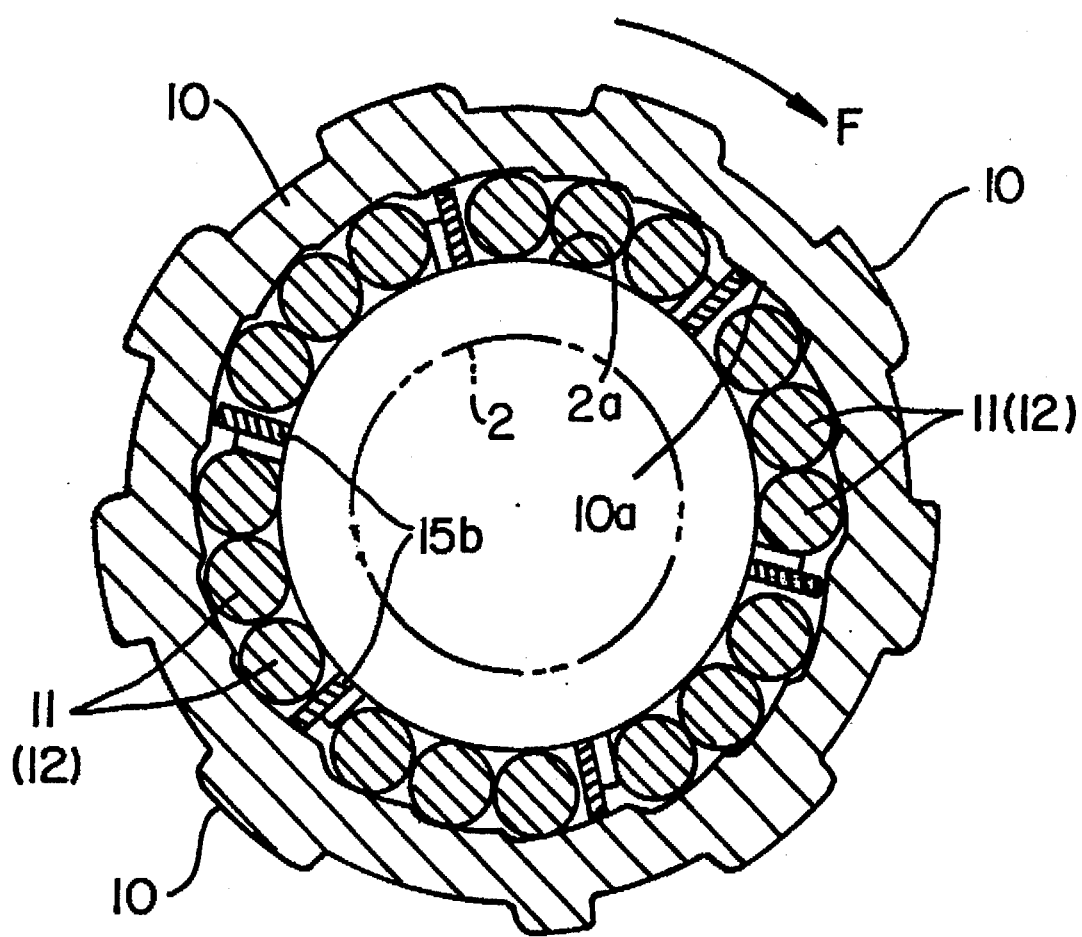
FIG. 9 is a cross-sectional view of an alternative embodiment of the one-way rotational transmission mechanism.

FIG. 9 is a cross-sectional view of an alternative embodiment of the one-way transmission shown in FIG. 1. In this embodiment, the spacing of the partitioning wall parts 15b of the cages 15 is increased, and clutch rollers 11 and 12 are positioned in contact with each other between the partitioning wall parts, so that the number of clutch rollers installed side by side in the circumferential direction of the outer member 10 and inner member 2 is increased, thus reducing the transmission load on each clutch roller.

While the above is a description of preferred embodiments of the present invention, various modifications may be employed. For example, the number of clutch rollers lined up end to end in the direction of the rotational axis of the hub body could be increased to three or more. It would also be possible to install the clutch rollers so that the clutch rollers are positioned to the outside of the hub rim of the hub body for the entire length of the clutch rollers. Consequently, the scope of the invention should not be limited to the specific embodiments described. Instead, the scope of the invention should be ascertained by the following claims.

What is claimed is:

1. A bicycle hub comprising:

a hub body (1);

an inner member (2) coupled to the hub body (1) for rotation therewith;

an outer member (10) disposed about the inner member (2) for rotation relative to the inner member (2);

wherein the outer member (10) is adapted to be coupled to a chain gear for rotation therewith;

a first plurality of clutch rollers (11) disposed between an outer circumferential surface (2a) of the inner member (2) and an inner circumferential surface (10a) of the outer member (10);

a second plurality of clutch rollers (12) disposed between an outer circumferential surface (2a) of the inner member (2) and an inner circumferential surface (10a) of the outer member (10);

wherein the first plurality of rollers (11) are disposed in series with the second plurality of rollers (12) along a rotational axis of the hub body (1);

wherein the first plurality of clutch rollers (11) are disposed axially inwardly of the second plurality of clutch rollers (12);

wherein the hub body (1) includes an insertion recess (16) which opens toward one end of the hub body (1), and wherein an end of the inner member (2), an end of the outer member (10), and an end of the first plurality of clutch rollers (11) are disposed in the insertion recess (16);

wherein the outer circumferential surface (2a) of the inner member (2) and the inner circumferential surface (10a) of the outer member (10) are shaped so that
   (i) when the first plurality of clutch rollers (11) and the second plurality of clutch rollers (12) are disposed in a first position, the inner member (2) and the outer member (10) rotate together; and
   (ii) when the first plurality of clutch rollers (11) and the second plurality of clutch rollers (12) are disposed in a second position, the inner member (2) and the outer member (10) can rotate relative to each other.

2. The bicycle hub according to claim 1 further comprising:

a hub shaft (6); and rotatable support means for rotatably supporting the hub body (1) and inner member (2) on the hub shaft (6).

3. The bicycle hub according to claim 2 wherein the rotatable support means comprises:

a first plurality of balls (4) for rotatably supporting the hub body (1) to the hub shaft (6); and a second plurality of balls (8) for rotatably supporting the inner member (2) to the hub shaft (6).

4. The bicycle hub according to claim 1 wherein a distance between the outer circumferential surface (2a) of the inner member (2) and the inner circumferential surface (10a) of the outer member (10) decreases in a direction opposite a forward rotational direction (F) of the outer member (10) so that
   (i) when the first plurality of clutch rollers (11) and the second plurality of clutch rollers (12) are disposed in a narrow section, the inner member (2) and the outer member (10) rotate together; and
   (ii) when the first plurality of clutch rollers (11) and the second plurality of clutch rollers (12) are disposed in a wider section, the inner member (2) and the outer member (10) can rotate relative to each other.

5. The bicycle hub according to claim 1 wherein the hub body includes a hub rim (1a), and wherein a bottom of the insertion recess (16) is disposed axially inwardly of the hub rim (1a).

6. The bicycle hub according to claim 1 wherein the outer member (10) is supported on the inner member (2) only by the first plurality of clutch rollers (11) and the second plurality of clutch rollers (12).

7. The bicycle hub according to claim 1 wherein the inner member (2) includes a spline (2b) for engaging a spline (1b) on the hub body (1), and further comprising a tubular screw (14) having a stopper (14b) on one end and a threaded portion (14a) on another end, wherein the threaded portion (14a) of the tubular screw (14) engages a threaded portion (1c) of the hub body (1) and the stopper (14b) engages a portion (2c) of the inner member (2) for retaining the inner member (2) to the hub body (1).

8. The bicycle hub according to claim 1 wherein the outer member (10) is supported on the inner member (2) by a first plurality of balls (17) disposed at a first end of the inner member (2) and a second plurality of balls (18) disposed at a second end of the inner member (2).

9. The bicycle hub according to claim 8 further comprising a plurality of support rollers (19) disposed between the outer member (10) and the hub body (1).

10. The bicycle hub according to claim 9 wherein the hub body (1) includes an insertion recess (16) which opens toward one end of the hub body (1), and wherein an end of the inner member (2), an end of the outer member (10), an end of the first plurality of clutch rollers (11), and an end of the plurality of support rollers (19) are disposed in the insertion recess (16).

11. The bicycle hub according to claim 1 wherein the inner member (2) includes a threaded portion (2d) which engages a threaded portion (1d) of the hub body (1) for connecting the inner member (2) to the hub body (1).

12. The bicycle hub according to claim 11 wherein the hub body (1) includes an insertion recess (16) which opens toward one end of the hub body (1), and wherein an end of the inner member (2), an end of the outer member (10), and an end of the first plurality of clutch rollers (11) are disposed in the insertion recess (16).

* * * * *